United States Patent
Oh et al.

(10) Patent No.: US 9,478,161 B2
(45) Date of Patent: Oct. 25, 2016

(54) IMAGE DISPLAY SYSTEM AND METHOD OF DRIVING THE SAME

(75) Inventors: Won Sik Oh, Seoul (KR); Yunki Baek, Suwon-si (KR); Jinho Park, Suwon-si (KR); Gigeun Kim, Seoul (KR); Cheolwoo Park, Suwon-si (KR); KyoungWon Lee, Yongin-si (KR); Heesoon Jeong, Suwon-si (KR); Jaemin Ha, Yongin-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 906 days.

(21) Appl. No.: 13/613,660

(22) Filed: Sep. 13, 2012

(65) Prior Publication Data
US 2013/0278790 A1    Oct. 24, 2013

(30) Foreign Application Priority Data
Apr. 18, 2012    (KR) ............ 10-2012-0040401

(51) Int. Cl.
*G09G 3/20*    (2006.01)
*G09G 3/36*    (2006.01)
*H04N 5/202*   (2006.01)

(52) U.S. Cl.
CPC ........... *G09G 3/2092* (2013.01); *G09G 3/3611* (2013.01); *H04N 5/202* (2013.01); *G09G 2320/028* (2013.01); *G09G 2320/0673* (2013.01); *G09G 2354/00* (2013.01)

(58) Field of Classification Search
CPC ............ G09G 3/2092; G09G 3/3611; G09G 2320/0673; G09G 2320/028; G09G 2354/00; H04N 5/202
See application file for complete search history.

(56) References Cited

U.S. PATENT DOCUMENTS

| 2006/0227103 | A1* | 10/2006 | Koo et al. ................. 345/156 |
| 2009/0213147 | A1* | 8/2009 | Sagardoyburu et al. ..... 345/690 |
| 2010/0238203 | A1* | 9/2010 | Stroemer ............ G09G 3/3611 345/690 |
| 2011/0228183 | A1* | 9/2011 | Hamagishi ................. 349/15 |
| 2011/0249042 | A1* | 10/2011 | Yamamoto et al. ........ 345/690 |
| 2012/0075355 | A1* | 3/2012 | Ogita et al. ................ 345/690 |
| 2012/0293405 | A1* | 11/2012 | Iida et al. .................. 345/156 |
| 2013/0009859 | A1* | 1/2013 | Woo .................. G02B 27/2214 345/156 |

FOREIGN PATENT DOCUMENTS

| JP | 2007-212664 |   | 8/2007 |
| KR | 1020060076477 | A | 7/2006 |
| KR | 1020100119342 | A | 11/2010 |
| KR | 1020110093192 |   | 8/2011 |
| KR | 1020110093464 | A | 8/2011 |
| KR | 1020110110543 | A | 10/2011 |
| WO | WO2011033855 | * | 3/2011 |

* cited by examiner

*Primary Examiner* — Aneeta Yodichkas
(74) *Attorney, Agent, or Firm* — F. Chau & Associates, LLC

(57) ABSTRACT

An image display system includes a camera part and an image display part. The image display part includes a user analyzer, a gamma corrector, a gamma voltage generator, and a display panel. The camera part takes a picture of a user and generates a user image signal. The user analyzer calculates the user's viewing direction based on the user image signal. The gamma corrector generates a correction gamma value based on the viewing direction. The gamma voltage generator generates a gamma voltage based on the correction gamma value, and the display panel displays an image corresponding to the gamma voltage. Accordingly, the image display system provides the image having an optimized gamma curve to the user in real time even without a separate input from the user.

5 Claims, 11 Drawing Sheets

IMAGE DISPLAY SYSTEM AND METHOD OF DRIVING THE SAME

CROSS-REFERENCE TO RELATED APPLICATION

This U.S. non-provisional patent application claims priority under 35 U.S.C. §119 of Korean Patent Application No. 10-2012-0040401, filed on Apr. 18, 2012, the contents of which are hereby incorporated by reference.

TECHNICAL FIELD

Embodiments of the present disclosure relate to an image display system and a method of driving the same. More particularly, embodiments of the present disclosure relate to an image display system that can increase display quality in consideration of a user's viewing direction and a method of driving the same.

DISCUSSION OF THE RELATED ART

Various display devices for electronic devices, such as computer monitors, mobile phones, or television sets have been developed.

Gamma values of display devices are fixed when the display devices are initially designed, so that the display quality of the display devices depends on a distance from a user or the user's position.

SUMMARY

Embodiments of the present disclosure provide an image display system that can increase display quality and control image brightness and sound in consideration of a user's position and a method of driving the image display system.

An embodiment of the inventive concept provides an image display system includes a camera part and an image display part. The image display part includes a user analyzer, a gamma corrector, a gamma voltage generator, and a display panel.

The camera part takes a picture of a user and generates a user image signal. The user analyzer receives the user image signal and calculates the user's viewing direction based on the user image signal. The gamma corrector generates a correction gamma value based on the viewing direction. The gamma voltage generator generates a gamma voltage based on the correction gamma value. The display panel displays an image corresponding to the gamma voltage.

The user analyzer includes a facial recognizer and a viewing direction calculator. The facial recognizer receives the user image signal and recognizes the user's face, and the viewing direction calculator calculates the user's viewing direction based on a position of the face.

According to an embodiment, the image display system further includes a light source and a light controller. The light source provides light to the display panel. The light source controller controls a brightness of the light source based on the viewing direction.

According to an embodiment, the image display system further includes a speaker module. The speaker module includes a sound corrector and a speaker. The sound corrector receives a sound data and generates a corrected sound data based on the viewing distance and the viewing direction. The speaker receives the corrected sound data and outputs the sound.

An embodiment of the inventive concepts provide an image display system includes a camera part and an image display part. The image display part includes a user analyzer, a timing controller, and a display panel. The camera part takes a picture of a user and generates a user image signal. The user analyzer receives the user image signal and calculates the user's viewing direction based on the user image signal. The timing controller receives image data and corrects the image data based on the viewing direction. The display panel displays an image corresponding to the corrected image data.

An embodiment of the inventive concept provides a method of driving an image display system includes taking a picture of a user and generating a user image signal, calculating a viewing direction of the user based on the user image signal, generating a correction gamma value based on the viewing direction, generating a gamma voltage based on the correction gamma value, and displaying an image corresponding to the gamma voltage.

According to an embodiment, there is provided an image display system including a camera configured to generate a user's image signal, a user analyzer configured to generate the user's positional information from the image signal, and a gamma corrector configured to correct a first gamma value into a second gamma value corresponding to the positional information.

The image display system may further include at least one of a speaker module configured to output a sound whose magnitude corresponds to the positional information, a light source controller configured to adjust brightness of a light source according to the positional information, or a data corrector configured to change a data format of an image corresponding to the user's image signal into another data format.

According to the embodiments, the gamma value or the image data is corrected based on the user's viewing direction in real time, and thus visibility of the image display system may be increased regardless of the user's position.

The image display system may allow the brightness and the sound of the image to be suited to the user in consideration of the user's viewing direction.

BRIEF DESCRIPTION OF THE DRAWINGS

The embodiments of the present invention will become readily apparent by reference to the following detailed description when considered in conjunction with the accompanying drawings wherein.

DETAILED DESCRIPTION

It will be understood that when an element or layer is referred to as being "on", "connected to" or "coupled to" another element or layer, it can be directly on, connected or coupled to the other element or layer or intervening elements or layers may be present. Like numbers may refer to like or similar elements throughout the specification and the drawings. As used herein, the term "and/or" includes any and all combinations of one or more of the associated listed items.

As used herein, the singular forms, "a", "an" and "the" are intended to include the plural forms as well, unless the context clearly indicates otherwise.

As will be appreciated by one skilled in the art, embodiments of the present invention may be embodied as a system, method, computer program product, or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device.

Hereinafter, embodiments of the present invention will be described in detail with reference to the accompanying drawings. The present invention may be embodied in various different ways and should not be construed as limited to the exemplary embodiments described herein.

Figure 1:
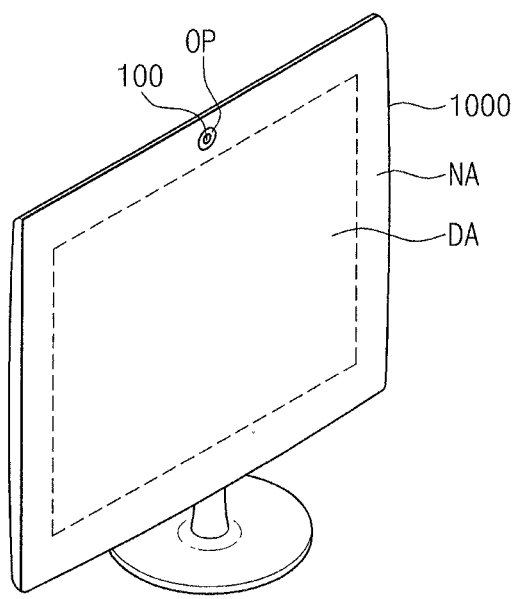
FIG. 1 is a perspective view showing an image display system according to an exemplary embodiment of the present invention.
Figure 2:
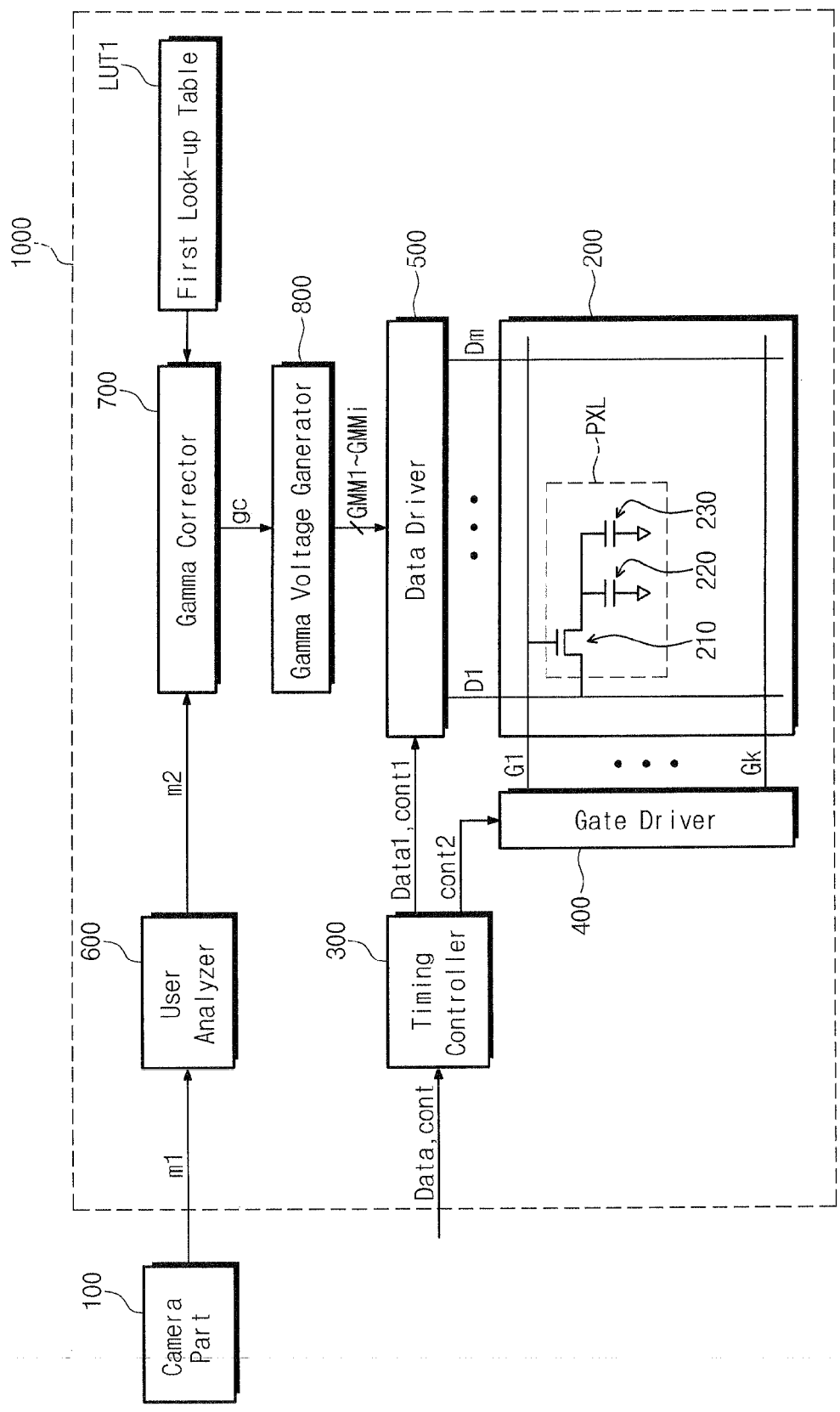
FIG. 2 is a block diagram showing the image display system shown in FIG. 1.

FIG. 1 is a perspective view showing an image display system according to an exemplary embodiment of the present invention. FIG. 2 is a block diagram showing the image display system shown in FIG. 1.

Referring to FIGS. 1 and 2, the image display system includes a camera part 100 and an image display part 1000.

The camera part 100 takes a picture of a user and generates a user image signal m1. For example, the camera part 100 takes a picture of a user positioned in front of the image display part 1000 at a predetermined distance and a predetermined angle, generates a user image signal m1 including the user's position information, and applies the user image signal m1 to the image display part 1000. According to an embodiment, the camera part 100 includes a real time motion picture camera, and the user image signal m1 includes a real time motion picture signal. The camera part 100 has a preset upper and lower view angle and a preset left and right view angle.

As shown in FIG. 1, the camera part 100 is embedded in the image display part 1000. According to an embodiment, the camera part 100 takes the picture of the user through an opening OP formed on a front portion of the image display part 1000. However, the camera part 100 is limited as being positioned in the image display part 1000. Alternatively, the camera part 100 is separated from the image display part 1000 and attached to an external side portion of the image display part 1000.

The image display part 1000 includes a display area DA and a non-display area NA disposed adjacent to at least a portion of the display area DA. The opening OP is positioned at the non-display area NA and exposes the camera part 100.

The image display part 1000 includes a display panel 200, a timing controller 300, a gate driver 400, a data driver 500, a user analyzer 600, a gamma corrector 700, and a gamma voltage generator 800.

The display panel 200 displays an image. The display panel 200 includes, but is not limited to, an organic light emitting display panel, a liquid crystal display panel, a plasma display panel, an electrophoretic display panel, or an electrowetting display panel. Hereinafter, as an example, a liquid crystal display panel is used as the display panel 200.

The display panel 200 includes a plurality of gate lines G1 to Gk applied with a gate signal and a plurality of data lines D1 to Dm applied with a data voltage. The gate lines G1 to Gk are insulated from and cross the data lines D1 to Dm. The display panel 200 includes a plurality of pixel areas arranged in a matrix form, and plural pixels are arranged in the pixel areas, respectively. As shown in FIG. 2, an equivalent circuit of one pixel PXL of the pixels is shown as an example. The pixel PXL includes a thin film transistor 210, a liquid crystal capacitor 220, and a storage capacitor 230.

According to an embodiment, the thin film transistor 210 includes a gate electrode, a source electrode, and a drain electrode. The gate electrode is connected to a first gate line G1 of the gate lines G1 to Gk, the source electrode is connected to a first data line DL1 of the data lines D1 to Dm, and the drain electrode is connected to the liquid crystal capacitor 220 and the storage capacitor 230.

The display panel 200 includes a first display substrate, a second display substrate facing the first display substrate, and a liquid crystal layer disposed between the first display substrate and the second display substrate.

The first display substrate includes the gate lines G1 to Gk, the data lines D1 to Dm, the thin film transistor 210, and a pixel electrode (not shown) that functions as a first electrode of the liquid crystal capacitor 220. The thin film transistor 210 applies the data voltage to the pixel electrode in response to the gate signal.

The second display substrate includes a common electrode (not shown) that functions as a second electrode of the liquid crystal capacitor 220. The common electrode is applied with a reference voltage. The liquid crystal layer is disposed between the pixel electrode and the common electrode and functions as a dielectric substance. The liquid crystal capacitor 220 is charged with a voltage corresponding to an electric potential between the data voltage and the reference voltage.

The timing controller 300 receives image data Data and control signals cont from an outside source of the image display part 1000. The control signals include a horizontal synchronization signal, a vertical synchronization signal, a main clock signal, and a data enable signal.

The timing controller 300 converts a data format of the image data Data to a data format suited for an interface between the data driver 500 and the timing controller 300 and applies the converted image data Data1 to the data driver 500. The timing controller 300 applies a data control signal cont1, such as an output start signal, a horizontal start signal, a horizontal clock signal, or a polarity inversion signal, to the data driver 500 and applies a gate control signal cont2, such as a vertical start signal, a vertical clock signal, or a vertical clock bar signal, to the gate driver 400.

The gate driver 400 is electrically connected to the gate lines G1 to Gk disposed on the display panel 200 and applies the gate signal to the gate lines G1 to Gk. For example, the gate driver 400 generates the gate signal to drive the gate lines G1 to Gk in response to the gate control signal cont2 from the timing controller 300 and sequentially applies the gate signal to the gate lines G1 to Gk.

The data driver 500 selects some of a plurality of gamma voltages GMM1 to GMMi, which correspond to the converted image data data1 in response to the data control signal cont1 provided from the timing controller 300 and generates data voltages, and applies the generated data voltages to the data lines D1 to DM.

The user analyzer 600 receives the user image signal m1 from the camera 100 and calculates the user's viewing direction based on the user image signal m1. The user analyzer 600 generates a user position signal m2 including information about the user's viewing direction and applies the user position signal m2 to the gamma corrector 700.

The image display part 1000 further includes a first look-up table LUT1 that stores a gamma value corresponding to the viewing direction.

The gamma corrector 700 reads out the gamma value corresponding to the viewing direction from the first look-up table LUT1 and generates a correction gamma value gc. The gamma corrector 700 applies the correction gamma value gc to the gamma voltage generator 800.

The gamma voltage generator 800 generates the gamma voltages GMM1 to GMMi, which have been previously set for gray-scale levels, respectively, in accordance with a gamma curve of the correction gamma value gc and applies the gamma voltages GMM1 to GMMi to the data driver 500.

Figure 3:
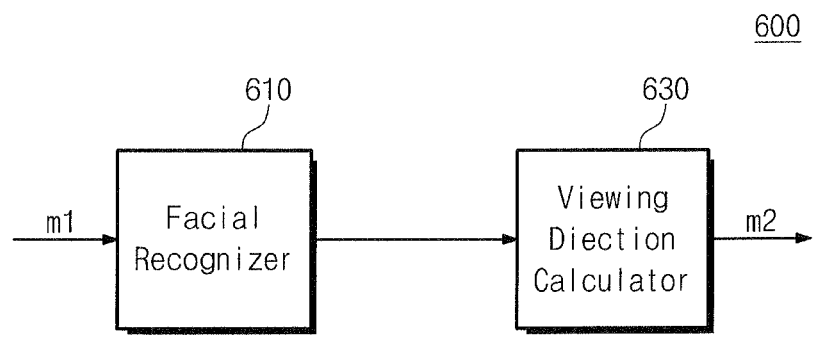
FIG. 3 is a block diagram showing the user analyzer shown in FIG. 2.

FIG. 3 is a block diagram showing the user analyzer 600 shown in FIG. 2.

Referring to FIG. 3, the user analyzer 600 includes a facial recognizer 610 and a viewing direction calculator 630.

The facial recognizer 610 extracts positions of a user's eyes, nose, and mouth based on the user image signal m1 and recognizes the user's facial features. According to an embodiment, when the facial recognizer 610 does not recognize the user's facial features, the image display part 1000 operates in a power saving mode after a predetermined time.

The viewing direction calculator 630 calculates the user's viewing direction based on the positions of the eyes, nose, and mouth. For example, the viewing direction calculator 630 calculates the viewing direction based on a center point of the user's two eyes and the upper and lower view angle and the left and right view angle of the camera part 100. According to an embodiment, the viewing direction calculator 630 calculates the user's upper and lower view angle and left and right view angle.

Figure 4:
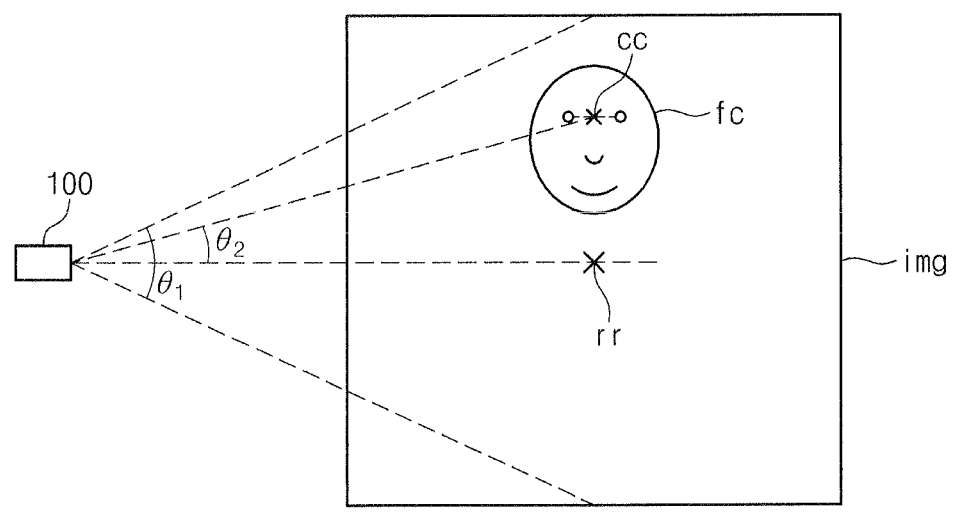
FIG. 4 is a view for describing a process of calculating a user's viewing direction.

FIG. 4 is a view for describing a process of calculating a user's viewing direction.

For convenience of description, FIG. 4 shows the user that looks down the image display part 1000 from a front upper side of the image display part 1000. However, according to an embodiment, the process of calculating the viewing direction applies to an example where the user views the image display part 1000 from lower, left, and right sides of the image display part 1000. For purposes of description, the user image signal m1 is represented as a user image img.

Referring to FIGS. 3 and 4, the camera part 100 has a preset upper and lower view angle θ1. The viewing direction calculator 630 determines that the user looks down the image display part 1000 when the user's face is positioned over a reference position rr in the user image img. According to an embodiment, the reference position rr is predetermined in the user image img, and as an example, the reference position rr is positioned at a center point of the user image img in FIG. 4. The viewing direction calculator 630 calculates the center point cc between the two eyes in the face fc and calculates a view angle θ2 based on the center point cc and the upper and lower view angle θ1. For instance, when the upper and lower view angle θ1 is about 45 degrees and when the center point cc is determined to be positioned at an upper central portion in the user image img, the view angle θ2 is about +22.5 degrees. Similarly, the view angle θ2 is about −22.5 degrees when it is determined that the center point cc is positioned at a lower central portion of the user image img. The viewing direction calculator 630 stores a plurality of view angles corresponding to positions of the center point cc.

Figure 5A:
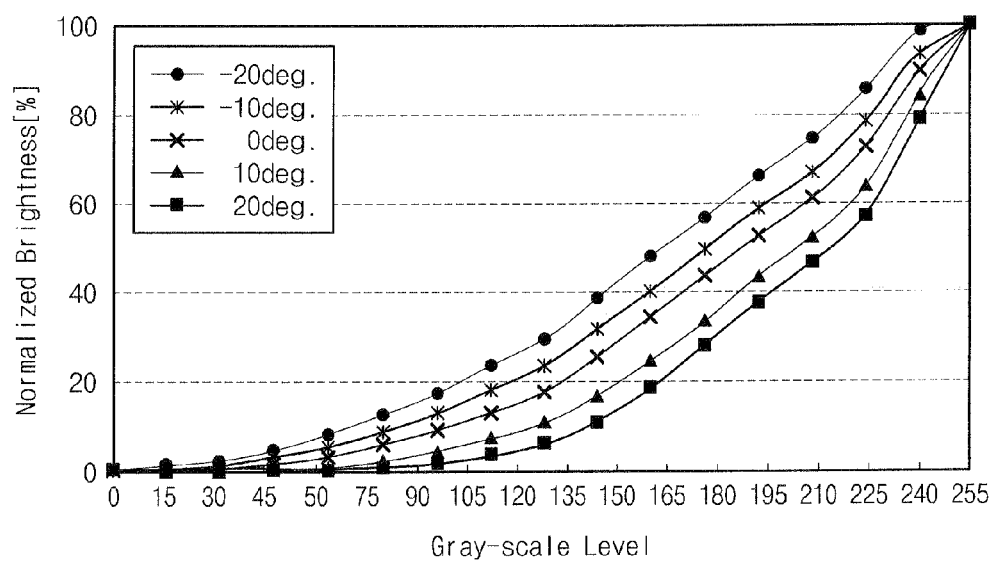
FIG. 5A is a graph showing gamma curves according to view angles.
Figure 5B:
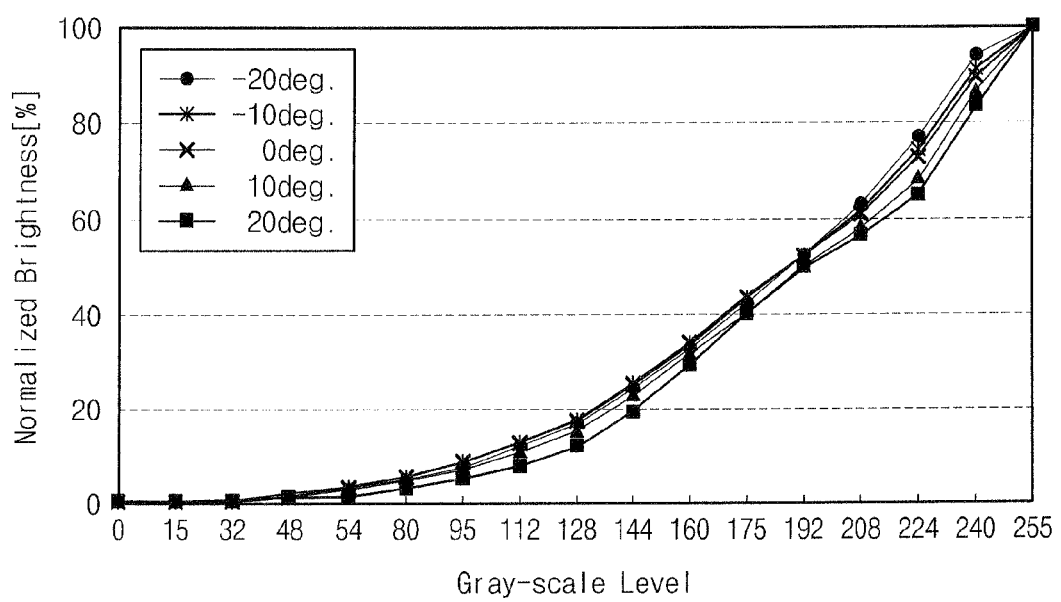
FIG. 5B is a graph showing gamma curves obtained by compensating for the gamma curves shown in FIG. 5A.

FIG. 5A is a graph showing gamma curves according to view angles, and FIG. 5B is a graph showing gamma curves obtained by compensating for the gamma curves shown in FIG. 5A.

Referring to FIGS. 2 and 5A, there are differences between the gamma curves obtained when the user views the image display part 1000 from front, upper, and lower sides of the image display part 1000. For example, the brightness perceived by the user is relatively higher when the user looks down the image display part 1000 than when the user views the image display part 1000 from the front side of the image display part 1000. The brightness perceived by the user is relatively lower when the user looks up the image display part 1000 than when the user views the image display part 1000 from the front side of the image display part 1000.

The correction gamma values that correct the gamma curves in accordance with the user's view angles are shown in Table 1:

TABLE 1

| View angle | −20 deg. | −10 deg. | 0 deg. | 10 deg. | 20 deg. |
|---|---|---|---|---|---|
| Correction gamma value | 1.2 | 1.7 | 2.2 | 2.6 | 3 |

Referring to Table 1, when the user looks up the image display part 1000 and the view angle is about 20 degrees, the gamma corrector 700 selects the correction gamma value of about 1.2. Similarly, when the user looks down the image display part 1000 and the view angle is about 20 degrees, the gamma corrector 700 selects the correction gamma value of about 3.

When the correction gamma values are applied, the gamma curves are substantially the same regardless of the view angles as shown in FIG. 5B.

The image display system may provide the image having optimized gamma curve to the user in real time even without a separate input from the user.

Figure 6:
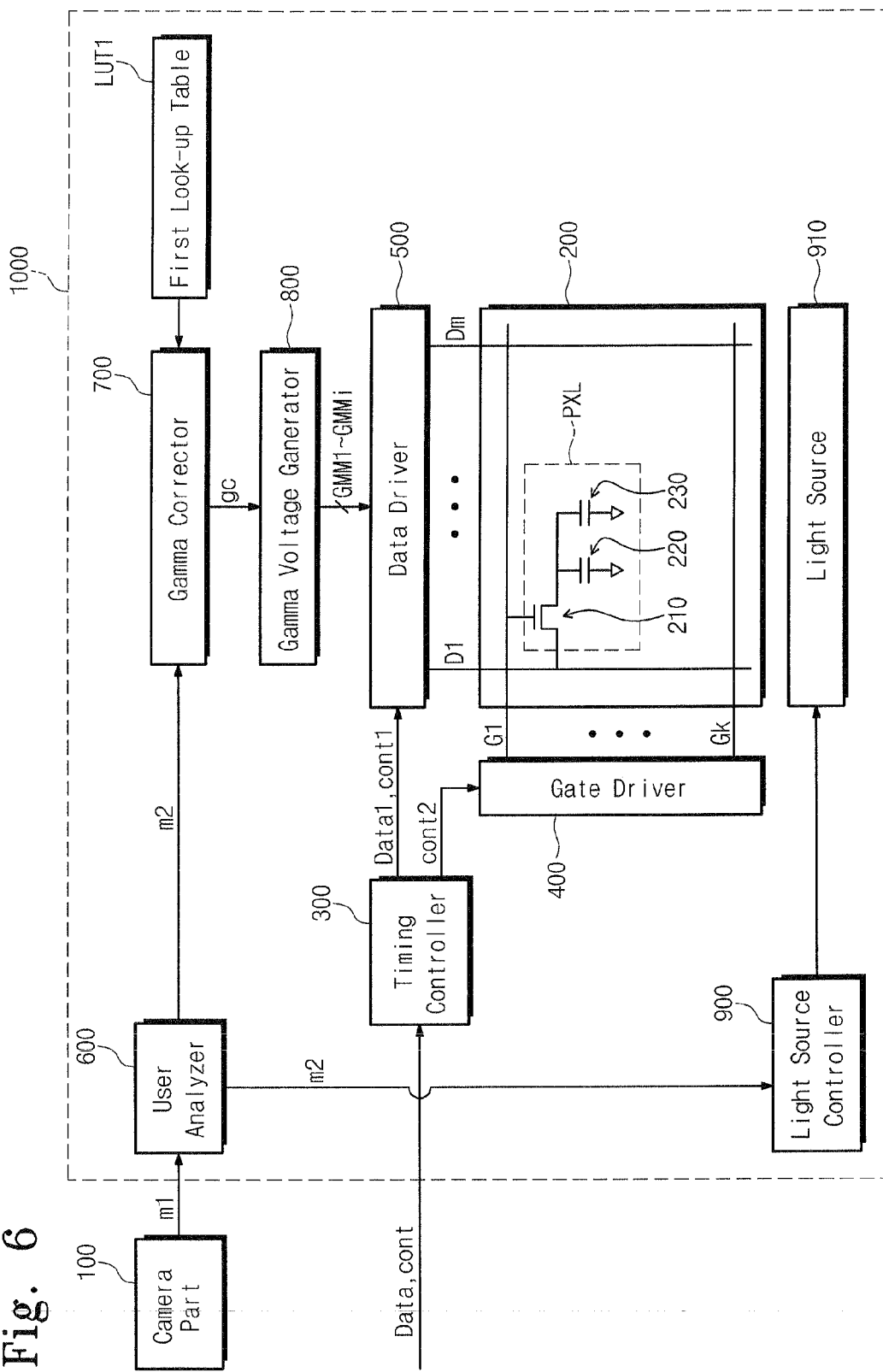
FIG. 6 is a block diagram showing an image display system according to an exemplary embodiment of the present invention.

FIG. 6 is a block diagram showing an image display system according to an exemplary embodiment of the present invention.

The image display system has the same or substantially the same in configuration and functions as the image display system described in connection with FIG. 2 except that the image display system illustrated in FIG. 6 further includes a light controller 900 and a light source 910.

Referring to FIG. 6, the light source 910 is disposed under the display panel 200 and supplies light to the display panel 200. According to an embodiment, a plurality of light sources 910 are provided. According to an embodiment, the light source 910 includes a point light source, such as a light emitting diode (LED), or a line light source, such as a cold cathode fluorescent lamp (CCFL).

The light source controller 900 controls the light source 910. The light source controller 900 receives the user position signal m2 from the user analyzer 600 and controls the brightness of the light source 910 based on the viewing direction. For instance, the light source controller 900 controls the light source 910 so that the brightness of the light source 910 decreases when the user looks down the image display part 1000 since the brightness perceived by the user is relatively higher when the user looks down the image display part 1000 than when the user views the image display part 1000 from the front of the image display part 1000. The light source controller 900 controls the light source 910 so that the brightness of the light source 910 increases when the user looks up the image display part 1000 since the brightness perceived by the user is relatively lower when the user looks up the image display part 1000 than when the user views the image display part 1000 from the front of the image display part 1000. The image display system may provide an image having an optimized gamma curve to the user in real time even without a separate input from the user.

Figure 7:
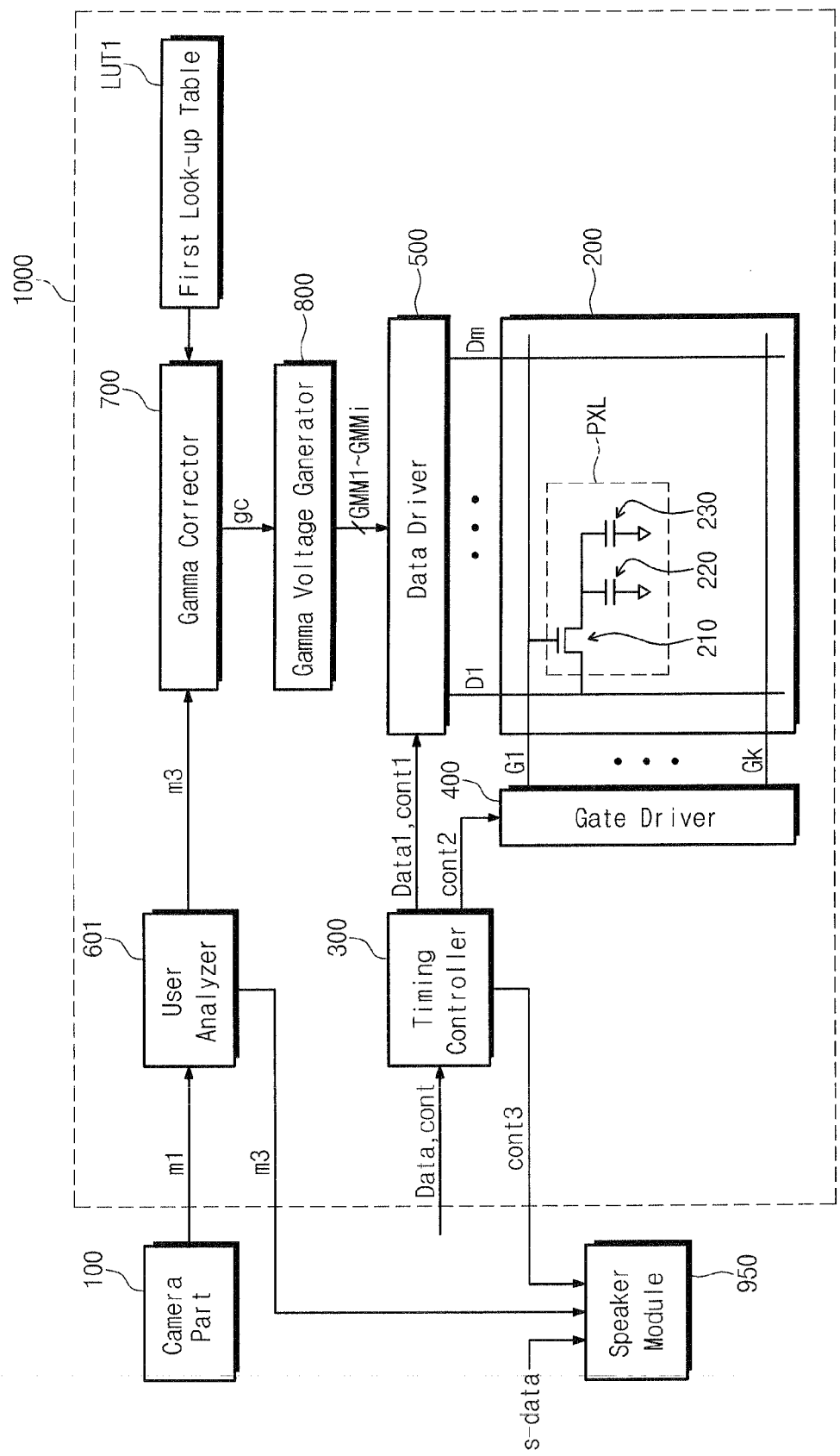
FIG. 7 is a block diagram showing an image display system according to an exemplary embodiment of the present invention.

FIG. 7 is a block diagram showing an image display system according to an exemplary embodiment of the present invention.

The image display system has the same or substantially the same in configuration and functions as the image display system described in connection with FIG. 2 except that the image display system illustrated in FIG. 7 further includes a speaker module 950 and includes a different configuration of the user analyzer.

Referring to FIG. 7, the user analyzer 601 generates a user position signal m3 including information about a user's viewing direction and viewing distance and applies the user position signal m3 to the gamma corrector 700 and the speaker module 950.

The speaker module 950 outputs a sound in synchronization with an image displayed on the display panel 200. The speaker module 950 receives sound data s-data from an external source (not shown), a sound synchronization signal cont3 from the timing controller 300, and the user position signal m3 from the user analyzer 600. The sound synchronization signal cont3 is used to synchronize the image displayed on the display panel 200 with the sound.

The speaker module 950 corrects an output level and timing of the sound data s-data based on the user position signal m3 and outputs the sound.

Figure 8:
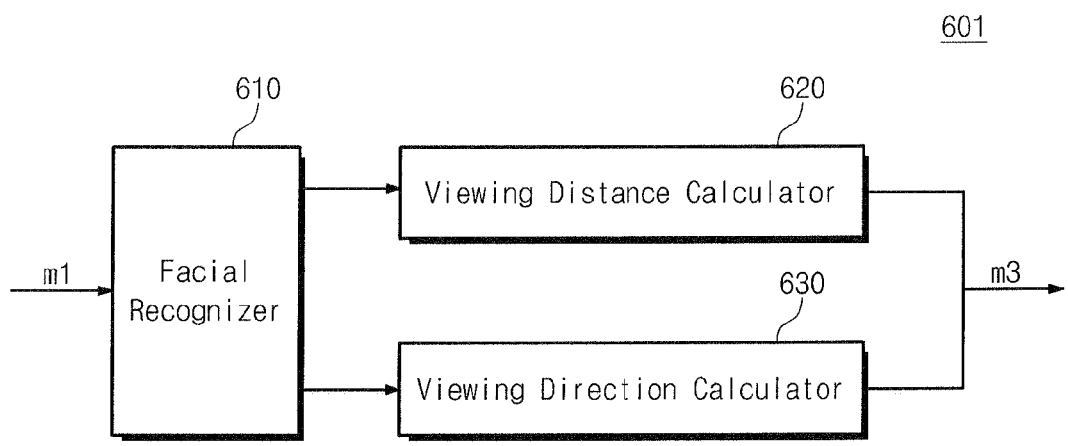
FIG. 8 is a block diagram showing the user analyzer shown in FIG. 7.

FIG. 8 is a block diagram showing the user analyzer shown in FIG. 7.

Referring to FIG. 8, the user analyzer 601 includes a facial recognizer 610, a viewing distance calculator 620, and a viewing direction calculator 630. The facial recognizer 610 and the viewing direction calculator 630, respectively, have the same or substantially the same in structure and functions as the facial recognizer and the viewing direction calculator described in connection with FIG. 3.

The viewing distance calculator 620 calculates a distance, e.g., a viewing distance, between the image display part 1000 and the user. For example, the viewing distance calculator 620 stores a plurality of viewing distance values in accordance with the size of the user's face and calculates the viewing distance based on the size of the user's face extracted from the user image signal m1.

Figure 9:
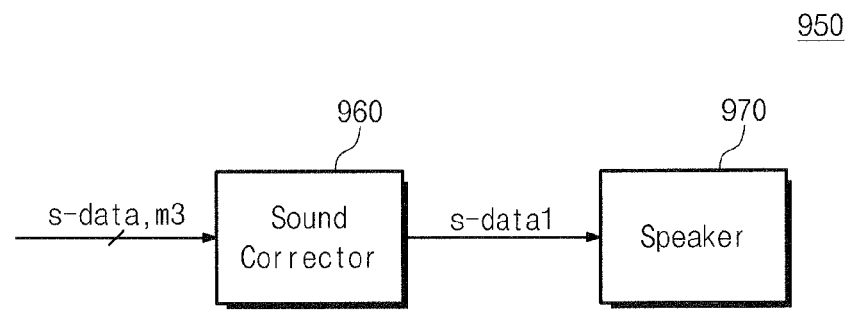
FIG. 9 is a block diagram showing the speaker module shown in FIG. 7.

FIG. 9 is a block diagram showing the speaker module shown in FIG. 7.

Referring to FIG. 9, the speaker module 950 includes a sound corrector 960 and a speaker 970. The sound corrector 960 receives the sound data s-data and the user position signal m3. The sound corrector 960 corrects the output level and the output timing of the sound data s-data based on the user's viewing distance and viewing direction included in the user position signal m3 and generates corrected sound data s-data1.

The speaker 970 receives the corrected sound data s-data1 and outputs the sound.

The image display system may provide an image having an optimized gamma curve to the user in real time even without the user's separate input.

Figure 10:
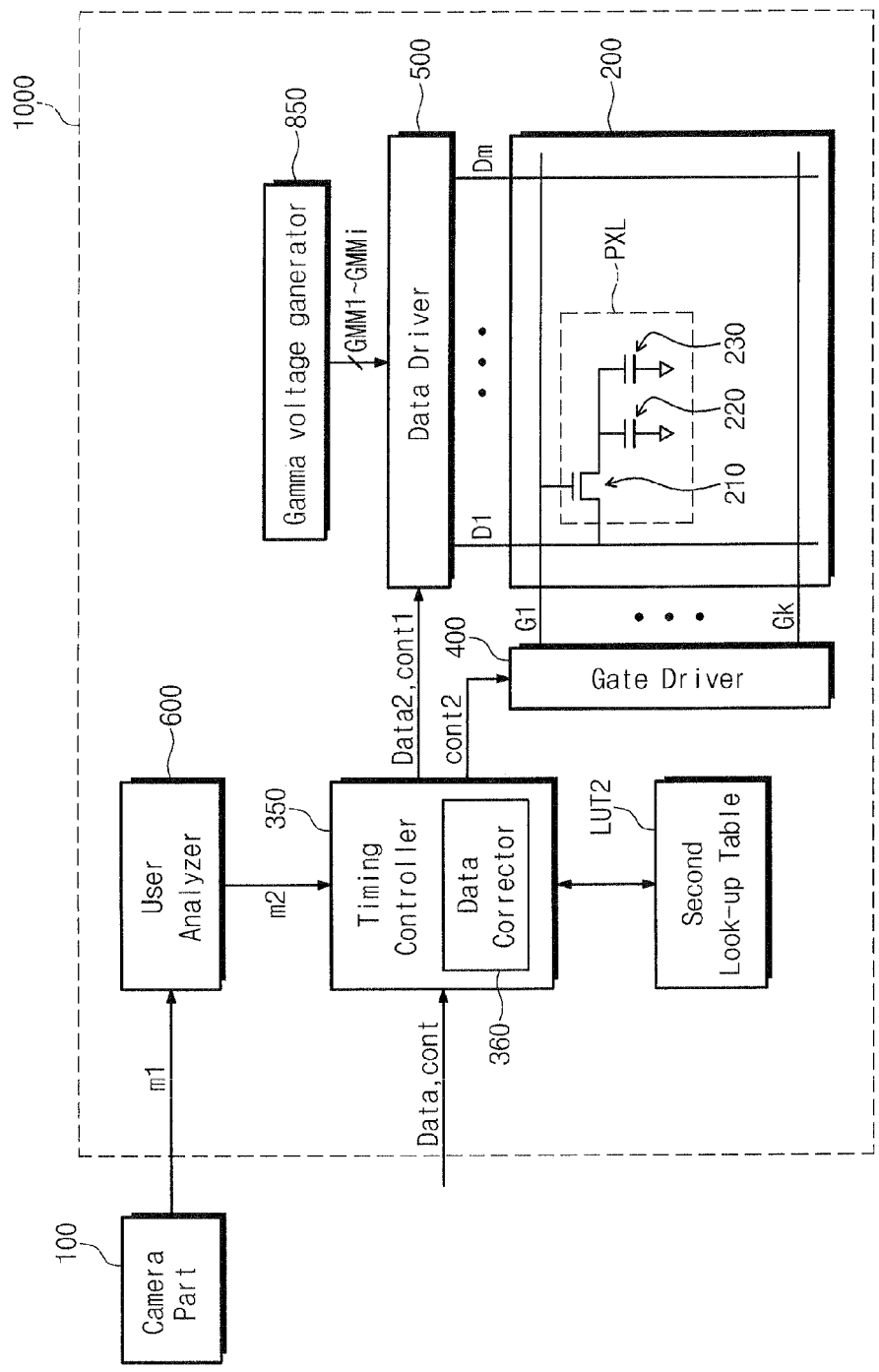
FIG. 10 is a block diagram showing an image display system according to an exemplary embodiment of the present invention.

FIG. 10 is a block diagram showing an image display system according to an exemplary embodiment of the present invention.

The image display system have the same or substantially the same in configuration and functions as the image display system described in connection with FIG. 2 except that the timing controller has a different configuration, a second look-up table LUT2 is included, the gamma voltage generator 850 has different functions, and the first look-up table LUT1 and the gamma corrector 700 are not provided. The image display system further includes a second look-up table LUT2 that stores a plurality of data values corresponding to the viewing direction.

The timing controller 350 receives image data Data and control signals cont from an outside source of the image display part 1000. The timing controller 350 receives a user position signal m2 from the user analyzer 600. The control signals cont include a horizontal synchronization signal, a vertical synchronization signal, a main clock signal, and a data enable signal.

The timing controller 350 corrects the image data Data based on the viewing direction of the user and converts a data format of the corrected image data Data to a data format suited for an interface between the data driver 500 and the timing controller 300 and applies the converted image data data2 to the data driver 500. The timing controller 350 applies a data control signal cont1, such as an output start signal, a horizontal start signal, a horizontal clock signal, or a polarity inversion signal, to the data driver 500 and applies a gate control signal cont2, such as a vertical start signal, a vertical clock signal, or a vertical clock bar signal, to the gate driver 400.

The timing controller 350 includes a data corrector 360. The data corrector 360 receives the user position signal m2 and corrects the image data Data based on the user's viewing direction. According to an embodiment, the data corrector 360 reads out a data value from the second look-up table LUT2, which corresponds to the viewing direction of the user, and generates the corrected image data. The data corrector 360 corrects gray scale information and brightness information of the image data Data.

The gamma voltage generator 850 generates the gamma voltages GMM1 to GMMi in accordance with a predetermined gamma curve and applies the gamma voltage GMM1 to GMMi to the data driver 500. Different from the image display system described in connection with FIG. 2, the image display system illustrated in FIG. 10 corrects the image data Data without correcting the gamma value. The image display system may provide an image having an optimized gamma curve to the user in real time even without a separate input from the user.

Figure 11:
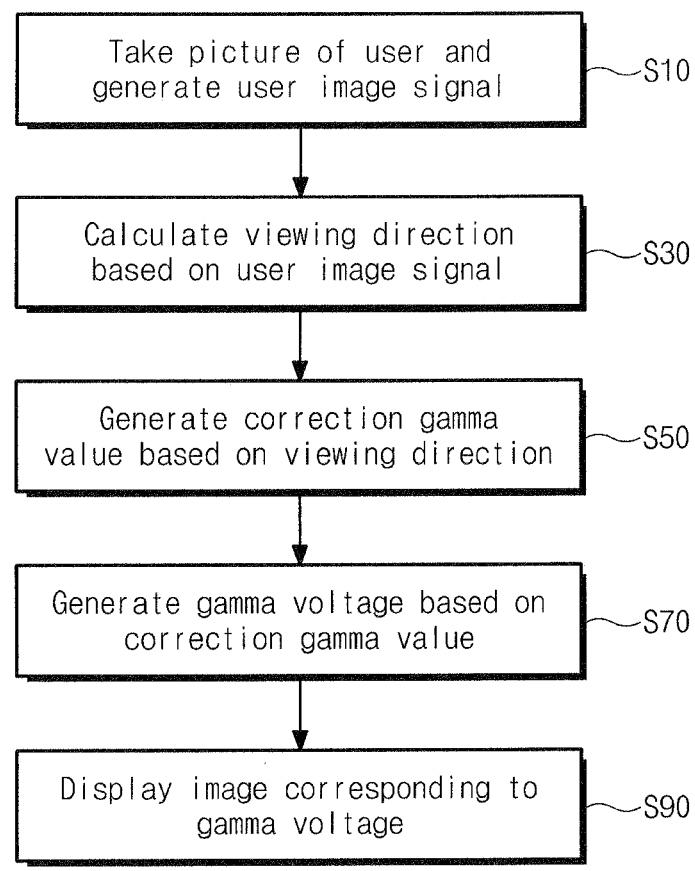
FIG. 11 is a flowchart illustrating a method of driving an image display system according to an embodiment of the present invention.

FIG. 11 is a flowchart illustrating a method of driving an image display system according to an embodiment of the present invention.

A user's picture is taken or the user's image is captured, and a user image signal is generated (S10). The user's viewing direction is calculated based on the user image signal (S30). A correction gamma value is generated based on the user's viewing direction (S50). A gamma voltage is generated based on the correction gamma value (S70). An image corresponding to the gamma voltage is displayed (S90).

Figure 12:
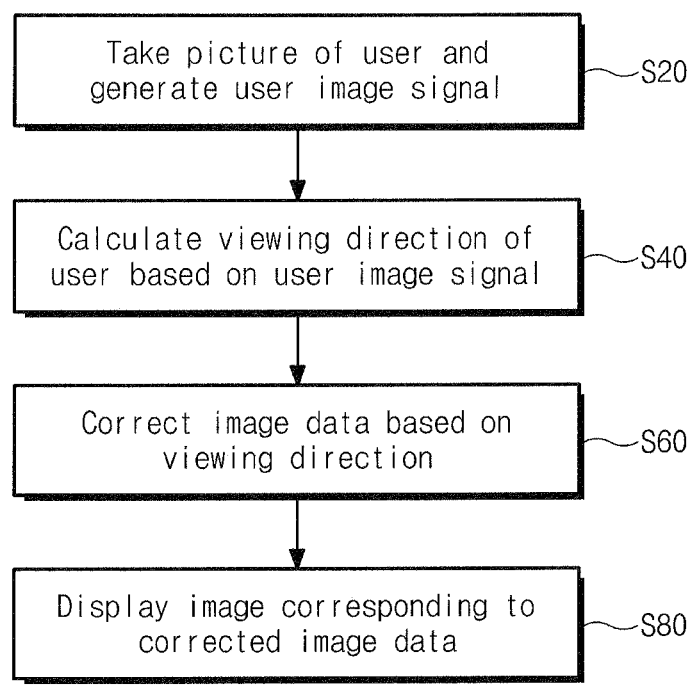
FIG. 12 is a flowchart illustrating a method of driving an image display system according to an embodiment of the present invention.

FIG. 12 is a flowchart illustrating a method of driving an image display system according to an embodiment of the present invention.

A user's picture is taken or the user's image is captured, and a user image signal is generated (S20). A viewing direction of the user is calculated based on the user image signal (S40). Image data is corrected based on the viewing direction of the user (S60). An image corresponding to the corrected image data is displayed (S80).

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An image display system comprising:
    a camera part configured to take a picture of a user and configured to generate a user image signal;
    a user analyzer configured to receive the user image signal and configured to calculate a viewing direction of the user based on the user image signal;
    a gamma corrector configured to generate a correction gamma value based on the viewing direction;
    a gamma voltage generator configured to generate a gamma voltage based on the correction gamma value; and
    a display panel configured to display an image corresponding to the gamma voltage,
    wherein the image has a first luminance value when the viewing direction is a first viewing direction looking up at the display panel, the image has a second luminance value greater than the first luminance value when the viewing direction is a second viewing direction looking down at the display panel,
    wherein the gamma corrector is configured to generate a first gamma value when the viewing direction is the first viewing direction and to generate a second gamma value greater than the first gamma value when the viewing direction is the second viewing direction.

2. The image display system of claim 1, wherein the user analyzer comprises:
    a facial recognizer configured to receive the user image signal and configured to recognize a face of the user; and
    a viewing direction calculator configured to calculate the viewing direction of the user based on a position of the face.

3. The image display system of claim 1, further comprising a look-up table configured to store a gamma value corresponding to the viewing direction.

4. The image display system of claim 1, further comprising:
    a light source configured to provide light to the display panel; and
    a light source controller configured to control a brightness of the light source based on the viewing direction.

5. A method of driving an image display system, the method comprising:
    taking a picture of a user and generating a user image signal;
    calculating a viewing direction of the user based on the user image signal;
    generating a correction gamma value based on the viewing direction;
    generating a gamma voltage based on the correction gamma value; and
    displaying an image corresponding to the gamma voltage on a display panel,
    wherein the image has a first luminance value when the viewing direction is a first viewing direction looking up at the display panel, the image has a second luminance value greater than the first luminance value when the viewing direction is a second viewing direction looking down at the display panel,
    wherein a first gamma value is generated when the viewing direction is the first viewing direction and a second gamma value greater than the first gamma value is generated when the viewing direction is the second viewing direction.

* * * * *